United States Patent
Lu et al.

(10) Patent No.: US 9,939,949 B2
(45) Date of Patent: Apr. 10, 2018

(54) TOUCH PANEL, TOUCH DEVICE AND DRIVING METHOD THEREOF

(71) Applicants: Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 153 days.

(21) Appl. No.: 14/965,822

(22) Filed: Dec. 10, 2015

(65) Prior Publication Data
US 2016/0188090 A1    Jun. 30, 2016

(30) Foreign Application Priority Data

Dec. 25, 2014   (CN) .......................... 2014 1 0840824

(51) Int. Cl.
  *G06F 3/041*   (2006.01)
  *G06F 3/046*   (2006.01)
  *G06F 3/044*   (2006.01)

(52) U.S. Cl.
  CPC ............ *G06F 3/0416* (2013.01); *G06F 3/044* (2013.01); *G06F 3/046* (2013.01); *G06F 2203/04106* (2013.01); *G06F 2203/04111* (2013.01)

(58) Field of Classification Search
  CPC . G06F 2203/04106; G06F 2203/04111; G06F 3/0416; G06F 3/044; G06F 3/046
  See application file for complete search history.

(56) References Cited

U.S. PATENT DOCUMENTS

| | | | | |
|---|---|---|---|---|
| 2012/0154326 A1* | 6/2012 | Liu | ....................... | G06F 3/0412 345/174 |
| 2012/0154327 A1* | 6/2012 | Liu | ....................... | G06F 3/0412 345/174 |
| 2013/0093724 A1* | 4/2013 | Liu | ....................... | G06F 3/0412 345/174 |
| 2014/0152621 A1* | 6/2014 | Okayama | .............. | G06F 3/0416 345/174 |

(Continued)

FOREIGN PATENT DOCUMENTS

| | | |
|---|---|---|
| CN | 102163112 A | 8/2011 |
| CN | 203616742 U | 5/2014 |
| CN | 104007876 A | 8/2014 |

(Continued)

*Primary Examiner* — Viet Pham
(74) *Attorney, Agent, or Firm* — Faegre Baker Daniels LLP

(57) ABSTRACT

A touch panel, a touch device and a driving method thereof are disclosed. The touch panel includes first coils each formed by at least two electrically connected first electrodes, a first terminal of each first coil is electrically connected with one corresponding first signal line, a second terminal of the first coil is electrically connected with the common line, and when an electromagnetic touch is performed, the first coil is configured to receive an electromagnetic signal and generate an induced current, and when a capacitive touch is performed, the first coil functions as a capacitive touch driving electrode.

20 Claims, 12 Drawing Sheets

(56) References Cited

U.S. PATENT DOCUMENTS

| | | | |
|---|---|---|---|
| 2015/0185905 A1* | 7/2015 | Ma | G06F 3/044 345/174 |
| 2016/0026276 A1* | 1/2016 | Lu | G06F 3/046 345/173 |

FOREIGN PATENT DOCUMENTS

| | | |
|---|---|---|
| CN | 104199588 A | 12/2014 |
| CN | 104216592 A | 12/2014 |

* cited by examiner

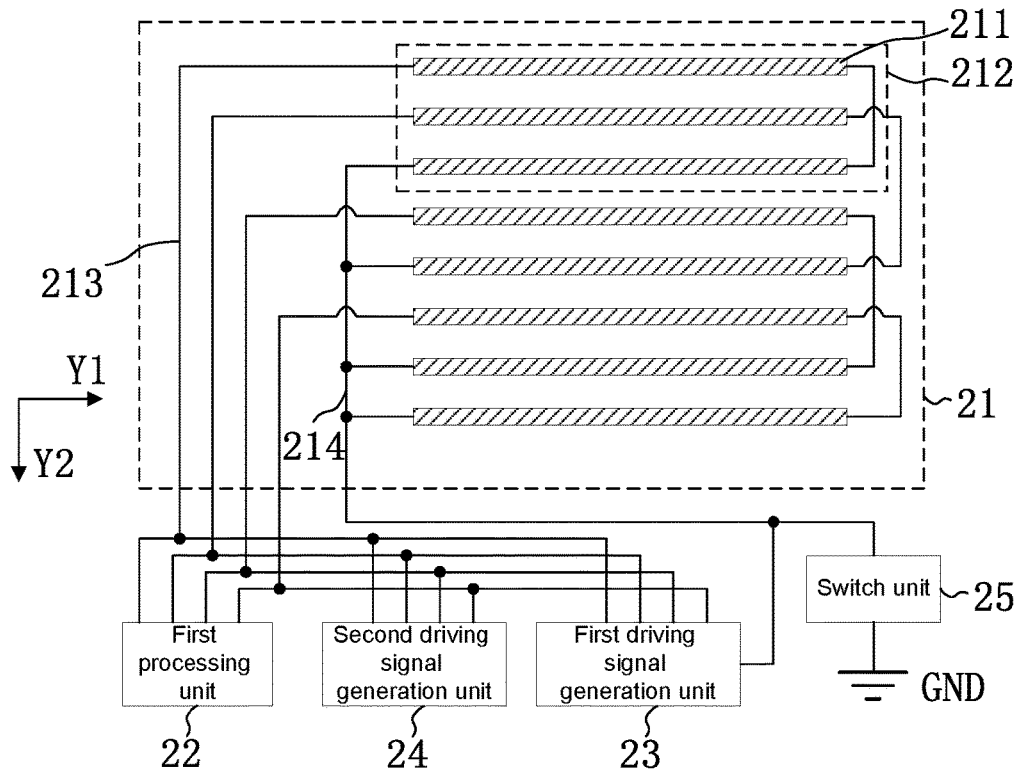

FIG.11

| Electrically connecting the common line with a grounding terminal and processing an induced current generated by the first coil and output by the first signal line, when performing the electromagnetic touch | 31 |

↓

Disconnecting the common line from the grounding terminal and applying a first driving signal to the common line when performing the capacitive touch; and applying, at any time during the capacitive touch, the first driving signal to a part of the first signal lines to perform an capacitive touch scanning on first coils electrically connected with the part of the first signal lines, and simultaneously applying a second driving signal to another part of the first signal lines, where the first driving signal has a phase inverse to a phase of the second driving signal — 32

FIG.12

TOUCH PANEL, TOUCH DEVICE AND DRIVING METHOD THEREOF

CROSS-REFERENCE TO RELATED APPLICATION

This application claims priority to Chinese Application No. 201410840824.X, filed Dec. 25, 2014, which is herein incorporated by reference in its entirety.

TECHNICAL FIELD

The present disclosure relates to the field of touch technologies and, in particular, to a touch panel, a touch device and a driving method thereof.

BACKGROUND

With developments of modern electronic technologies, components are provided in an electronic device to achieve corresponding functions such as an electromagnetic touch function and a capacitive touch function, so as to provide a user with convenience in use.

In order for a better touch function, an electromagnetic coil configured for realizing the electromagnetic touch function and electrodes configured for realizing the capacitive touch function are generally provided in the electronic device, and the electromagnetic coil and the electrodes are arranged independently of each other. In recent years, with increasing user demands for the appearances of electronic devices, layouts of the electrodes for realizing the capacitive touch function and the electromagnetic coils are limited by the limited design space in the electronic device, thereby degrading electromagnetic touch performance.

SUMMARY

In view of this, embodiments of the disclosure provide a touch panel, a touch device and a driving method thereof to solve the technical problem of the poor electromagnetic touch performance in the related art.

In one example, the disclosure provides a touch panel, including:
- a plurality of first electrodes extending along a first direction and arranged along a second direction;
- a plurality of first signal lines;
- a common line; and
- first coils arranged along the second direction and each formed by at least two electrically connected first electrodes from the plurality of first electrodes, where a first terminal of each first coil is electrically connected with corresponding one of the first signal lines, and a second terminal of each first coil is electrically connected with the common line;
- the first coil is configured to receive an electromagnetic signal and generate an induced current when an electromagnetic touch is performed, and function as a capacitive touch driving electrode when a capacitive touch is performed.

In another example, the disclosure provides a touch device including the touch panel in the first example mentioned above.

In yet another example, the disclosure provides a driving method for a touch device including a touch panel, where the touch panel includes: a plurality of first electrodes extending in a first direction and arranged in a second direction; a plurality of first signal lines; a common line; and first coils arranged along the second direction and each formed by at least two electrically connected first electrodes from the plurality of first electrodes, where a first terminal of each first coil is electrically connected with a corresponding first signal line, and a second terminal of each first coil is electrically connected with the common line; and when an electromagnetic touch is performed, the first coil is configured to receive an electromagnetic signal and generate an induced current; and when a capacitive touch is performed, the first coil functions as a capacitive touch driving electrode, wherein the driving method comprises:
- electrically connecting the common line with the grounding terminal and processing the induced current generated by the first coil and output by the first signal line, when performing the electromagnetic touch; and
- disconnecting the common line from the grounding terminal and applying a first driving signal to the common line when performing the capacitive touch;
- and applying, at any time during the capacitive touch, the first driving signal to a part of the first signal lines to perform an capacitive touch scanning on first coils electrically connected with the part of the first signal lines, and simultaneously applying a second driving signal to another part of the first signal lines, where the first driving signal has a phase inverse to that of the second driving signal.

With the touch panel, the touch device and the driving method thereof, first coils each formed by at least two electrically connected first electrodes are provided, where a first terminal of each first coil is electrically connected with one corresponding first signal line, a second terminal of the first coil is electrically connected with the common line, and when an electromagnetic touch is performed, the first coil is configured to receive an electromagnetic signal and generate an induced current, and when a capacitive touch is performed, the first coil functions as a capacitive touch driving electrode, so that the design space of the touch panel can be saved and the electromagnetic touch performance of the touch panel and the touch device can be improved, thereby increasing the signal to noise ratio (SNR) in the touch panel and the touch device when performing the electromagnetic touch.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Features, objects and advantages of the disclosure will become more apparent from the detailed description of non-limiting embodiments made with reference to the accompany drawings, in which:

FIG. 11 is a schematic view showing a structure of a specifically embodied touch device, according to embodiments of the disclosure;

FIG. 12 is a flow chart showing a driving method of a touch device, according to embodiments of the disclosure.

Figure 1:
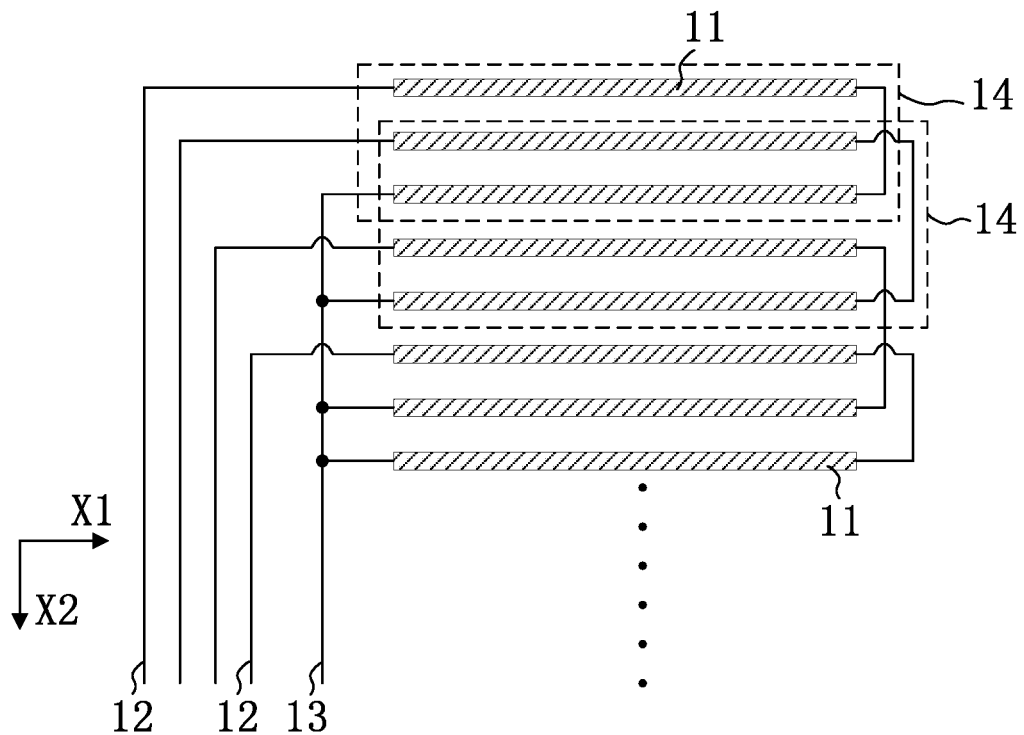
FIG. 1 is a schematic view showing a structure of a touch panel, according to embodiments of the disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be described in detail through embodiments below in conjunction with the accompanying drawings. It should be understood that specific embodiments described herein are for explaining the disclosure rather than limiting the disclosure. In addition, it should be noted that merely partial content associated with the disclosure rather than all contents is illustrated in the accompanying drawings.

A touch panel is provided in embodiments of the disclosure. FIG. 1 is a schematic view showing a structure of a touch panel, according to embodiments of the disclosure. As shown in FIG. 1, the touch panel includes: a plurality of first electrodes 11 extending along a first direction X1 and arranged along a second direction X2; a plurality of first signal lines 12; and a common line 13; where a plurality of first coils 14, each formed by at least two electrically connected first electrodes 11, are arranged along the second direction X2, a first terminal of each first coil 14 is electrically connected with corresponding one of the first signal lines 12, and a second terminal of each first coil 14 is electrically connected with the common line 13; and the first coil 14 is configured to receive an electromagnetic signal and generate an induced current when an electromagnetic touch is performed, and to function as (i.e. be driven as) a capacitive touch driving electrode when a capacitive touch is performed.

As described above, the first coil 14 functions as an electromagnetic coil for realizing the electromagnetic touch function when the electromagnetic touch is performed, and functions as a capacitive touch driving electrode when the capacitive touch is performed. Compared with integrating the electromagnetic coil for realizing the electromagnetic touch function together with the electrode for realizing the capacitive touch which are independent of each other, technical solutions of the present disclosure can save space in the touch panel, so that the layouts of the electrode for realizing the capacitive touch function and the electromagnetic coil are made simple so as to improve the electromagnetic touch performance of the touch panel, thereby improving a Signal-to-Noise Ratio (SNR) in the case of the electromagnetic touch on the touch panel.

As shown in FIG. 1, two first electrodes 11 are electrically connected with each other to form one first coil 14, as such, if the number of the first electrodes 11 is N (hereinafter, with respect to the case where two first electrodes 11 are electrically connected with each other to form one first coil 11, it is also presumed that the number of the first electrodes is N), then the N first electrodes form N/2 first coils 14, where N is an even integer greater than 0. Moreover, as shown in FIG. 1, along a second direction X2, a right-side terminal of the first one of the first electrodes 11 is electrically connected with a right-side terminal of the third one of the first electrodes 11 to form a first coil 14, where a left-side terminal of the first one of the first electrodes 11 functions as a first terminal of the first coil 14, and a left-side terminal of the third one of the first electrodes 11 functions as a second terminal of the first coil 14; likewise, a right-side terminal of the $2j^{th}$ one of the first electrodes 11 is electrically connected with a right-side terminal of the $(2j+3)^{th}$ one of the first electrodes 11 to form a first coil 14, where a left-side terminal of the $2j^{th}$ one of the first electrodes 11 functions as a first terminal of the corresponding first coil 14, and a left-side terminal of the $(2j+3)^{th}$ one of the first electrodes 11 functions as a second terminal of the corresponding first coil 14; and a right-side terminal of the $(N-2)^{th}$ one of the first electrodes 11 is electrically connected with a right-side terminal of the $N^{th}$ one of the first electrodes 11 to form a first coil 14, where a left-side terminal of the $(N-2)^{th}$ one of the first electrodes 11 functions as a first terminal of the corresponding first coil 14, and a left-side terminal of the $N^{th}$ one of the first electrodes 11 functions as a second terminal of the corresponding first coil 14, where j is an integer greater than or equal to 1 and less than or equal to $(N-4)/2$. With respect to the first electrodes 11 shown in FIG. 1, N is an even integer greater than or equal to 8. For example, when N is equal to 8, along the second direction X2, the right-side terminal of the first one of the first electrodes 11 is electrically connected with the right-side terminal of the third one of the first electrodes 11 to form one first coil 14, where the left-side terminal of the first one of the first electrodes 11 functions as the first terminal of the corresponding first coil 14, the left-side terminal of the third one of the first electrodes 11 functions as the second terminal of the corresponding first coil 14; similarly, the second one of the first electrodes 11 is electrically connected with the fifth one of the first electrodes 11 to form one first coil 14, the fourth one of the first electrodes 11 is electrically connected with the seventh one of the first electrodes 11 to form one first coil 14, and the sixth one of the first electrodes 11 is electrically connected with the eighth one of the first electrodes 11 to form one first coil 14; here, first terminals of all the first coils 14 are electrically connected with corresponding first signal lines 12, and second terminals of all the first coils 14 are electrically connected with the common line 13. It should be noted that, as can be seen from the number of the first electrodes 11 given in FIG. 1, N is an even integer greater than or equal to 8; however, N may be any even integer greater than or equal to 6 when one first coil 14 is formed actually in the above manner of combining two first electrodes 11.

Figure 2:
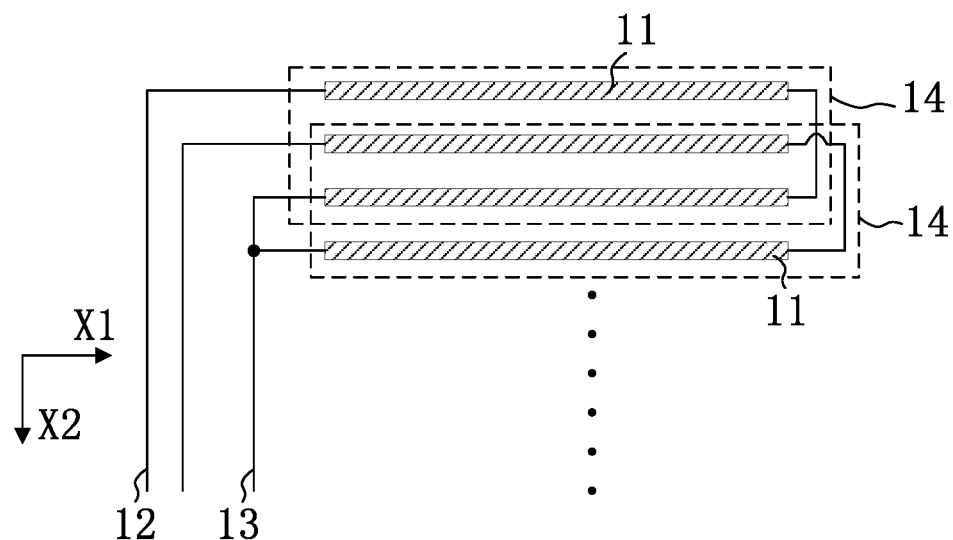
FIG. 2 is a schematic view showing a structure of another touch panel, according to embodiments of the disclosure.

The manner of combining two first electrodes 11 shown in FIG. 1 only represents an example of forming one first coil 14 by two first electrodes 11 in the disclosure. FIG. 2 is a schematic view showing the structure of another touch panel, according to embodiments of the disclosure, where, as shown in FIG. 2, along the second direction X2, a right-side terminal of the $(2i-1)^{th}$ one of the first electrodes 11 is electrically connected with a right-side terminal of the $(2i+1)^{th}$ one of the first electrodes 11 to form a first coil 14, where a left-side terminal of the $(2i-1)^{th}$ one of the first electrodes 11 functions as a first terminal of the first coil 14, and a left-side terminal of the $(2i+1)^{th}$ one of the first electrodes 11 functions as a second terminal of the first coil 14; and a right-side terminal of the $2i^{th}$ one of the first electrodes 11 is electrically connected with a right-side terminal of the $(2i+2)^{th}$ one of the first electrodes 11 to form a first coil 14, where a left-side terminal of the $2i^{th}$ one of the first electrodes 11 functions as a first terminal of the corresponding first coil 14, and a left-side terminal of the $(2i+2)^{th}$ one of the first electrodes 11 functions as a second terminal of the corresponding first coil 14, where i is an integer greater than or equal to 1 and less than or equal to (N−2)/2. With respect to the manner of combining two first electrodes electrically connected with each other to form one first coil 14 shown in FIG. 2, N is an integral multiple of 4. For example, when N is equal to 8, along the second direction X2, the right-side terminal of the first one of the first electrodes 11 is electrically connected with the right-side terminal of the third one of the first electrodes 11 to form one first coil 14, where the left-side terminal of the first one of the first electrodes 11 functions as the first terminal of the corresponding first coil 14, and the left-side terminal of the third one of the first electrodes 11 functions as the second terminal of the corresponding first coil 14; similarly, the second one of the first electrodes 11 is electrically connected with the fourth one of the first electrodes 11 to form one first coil 14, the fifth one of the first electrodes 11 is electrically connected with the seventh one of the first electrodes 11 to form one first coil 14, and the sixth one of the first electrodes 11 is electrically connected with the eighth one of the first electrodes 11 to form one first coil 14, where each of the first terminals of all the first coils 14 is electrically connected with the corresponding first signal line 12, and each of the second terminals of all the first coils 14 is electrically connected with the common line 13.

In addition to the manners of forming each first coil 14 by electrically connecting two first electrodes 11 as shown in FIGS. 1 and 2, other manners of forming each first coil by two electrically connected first electrodes can be used, which is not limited.

Figure 3:
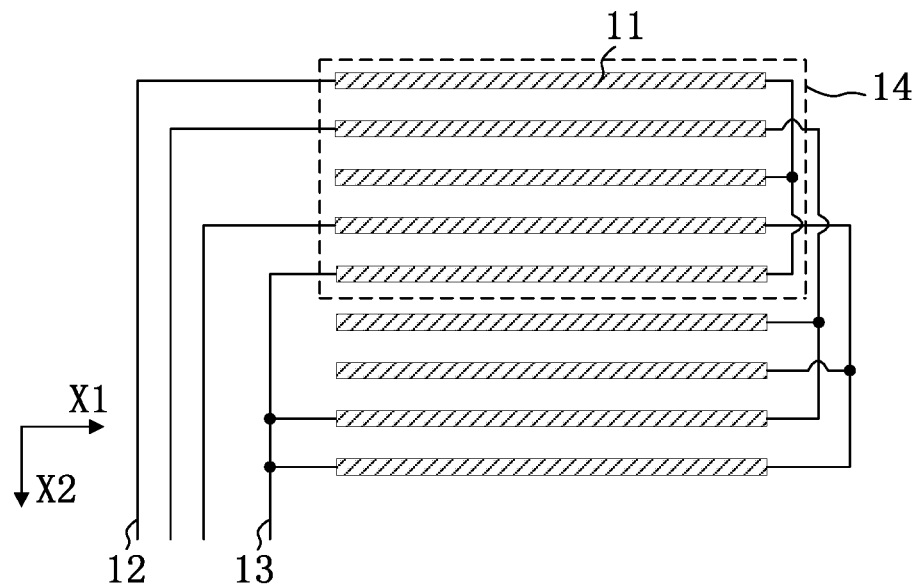
FIG. 3 is a schematic view showing a structure of yet another touch panel, according to embodiments of the disclosure.

In addition to that two first electrodes are electrically connected with each other to form one first coil, three or more first electrodes can be electrically connected with each other to form one first coil. FIG. 3 is a schematic view showing the structure of yet another touch panel, according to embodiments of the disclosure. As shown in FIG. 3, the touch panel includes 9 first electrodes 11 extending along the first direction X1 and arranged along the second direction X2, where along the second direction X2, the first one of the first electrodes 11, the third one of the first electrodes 11 and the fifth one of the first electrodes 11 are electrically connected with each other at right-side terminals thereof to form one first coil 14, a left-side terminal of the first one of the first electrodes 11 functions as a first terminal of the formed first coil 14, and a left-side terminal of the fifth one of the first electrodes 11 functions as a second terminal of the formed first coil 14; the second one of the first electrodes 11, the sixth one of the first electrodes 11 and the eighth one of the first electrodes 11 are electrically connected with each other at right-side terminals thereof to form one first coil 14, a left-side terminal of the second one of the first electrodes 11 functions as a first terminal of the formed first coil 14, and a left-side terminal of the eighth one of the first electrodes 11 functions as a second terminal of the formed first coil 14; the fourth one of the first electrodes 11, the seventh one of the first electrodes 11 and the ninth one of the first electrodes 11 are electrically connected with each other at right-side terminals thereof to form one first coil 14, a left-side terminal of the fourth one of the first electrodes 11 functions as a first terminal of the formed first coil 14, and a left-side terminal of the ninth one of the first electrodes 11 functions as a second terminal of the formed first coil 14, where each of the first terminals of all the first coils 14 is electrically connected with the corresponding first signal line 12, and each of the second terminals of all the first coils 14 is electrically connected with the common line 13. It should be noted that FIG. 3 only shows an example in which three first electrodes 11 are combined together to form one first coil of the disclosure. However, the number of the first electrodes and the manner of combining three first electrodes together to form one first coil is not limited herein.

Figure 4A:
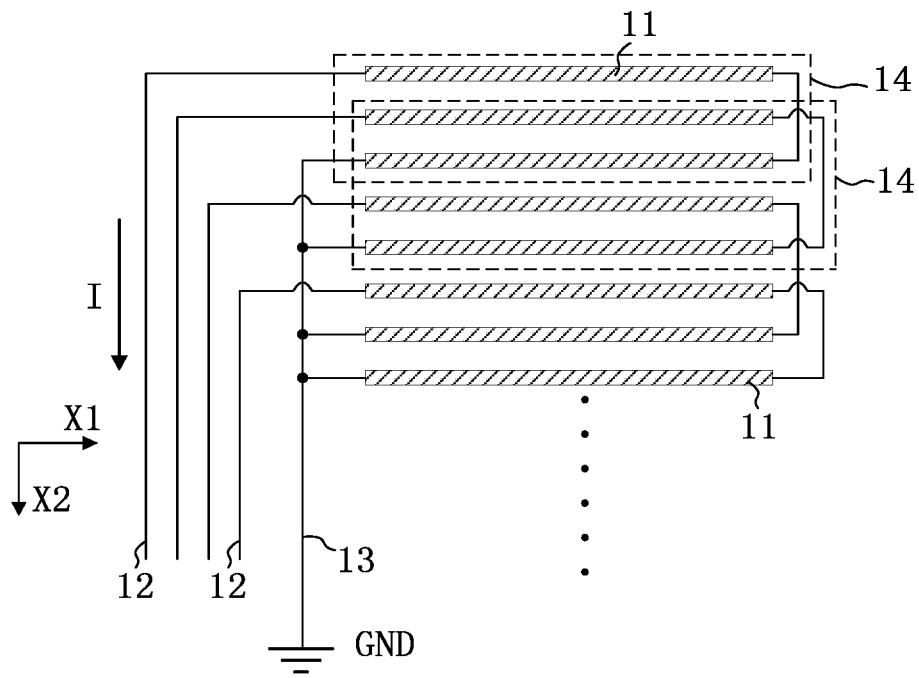
FIG. 4A is a schematic view showing a touch panel under an electromagnetic touch state, according to embodiments of the disclosure.
Figure 4B:
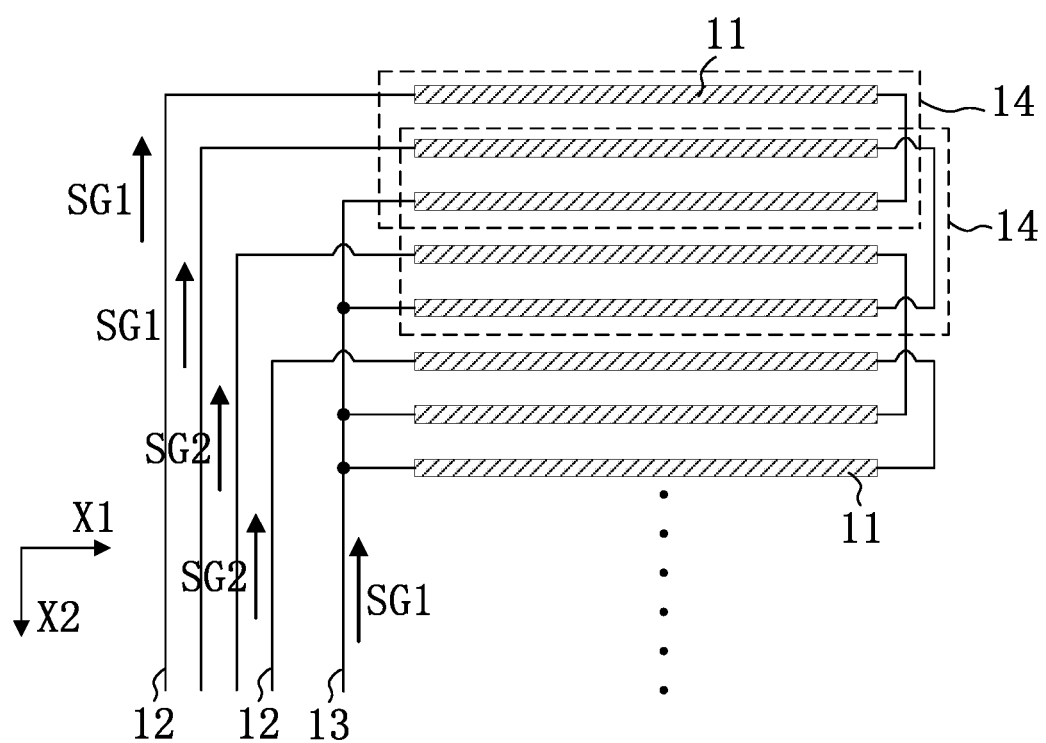
FIG. 4B is a schematic view showing a touch panel under a capacitive touch state, according to embodiments of the disclosure.

FIG. 4A is a schematic view showing the structure of a touch panel under an electromagnetic touch state, according to embodiments of the disclosure. In embodiments of the disclosure, as shown in FIG. 4A based on the touch panel in FIG. 1, when an electromagnetic touch is performed on the touch panel (which is hence in the electromagnetic touch state), the common line 13 is electrically connected with a grounding terminal GND, and an induced current I generated by a first coil 14 electrically connected with the first signal line 12 is output by the first signal line 12. As shown in FIG. 4B which is a schematic view showing the structure of the touch panel under a capacitive touch state, according to embodiments of the disclosure, the first signal lines 12 are sequentially arranged from the left side to the right side, where the leftmost first signal line 12 is the first one of the first signal lines 12; when a capacitive touch is performed on the touch panel, the common line 13 receives a first driving signal SG1, and at any time during the capacitive touch, the first one of the first signal lines 12 and the second one of the first signal lines 12 receive the first driving signal SG1, the third one of the first signal lines 12, the fourth one of the first signal lines 12 and the remaining first signal lines 12 each receive a second driving signal SG2 having a phase inverse to that of the first driving signal SG1. As such, at any time during the capacitive touch, one part of the first signal lines 12 receive the first driving signal SG1, the other part of the first signal lines 12 receive the second driving signal SG2, and the first driving signal SG1 has a phase inverse to that of the second driving signal SG2. It should be noted that the first driving signal SG1 is used for driving the first coil as a capacitive touch driving electrode to perform the capacitive touch scanning. It should be also noted that the one part of first signal lines 12 can include one or more first signal lines 12, which is not limited herein.

At any time during the capacitive touch, generally only a part of capacitive touch driving electrodes receive driving signals to perform the capacitive touch scanning, that is, at any time during the capacitive touch, only a part of the capacitive touch driving electrodes, which may be adjacent to one another or not, are used for the capacitive touch scanning. In the disclosure, the first coil 14 functions as the capacitive touch driving electrode, and when the capacitive touch is performed, the common line 13 receives the first driving signal SG1 and the first driving signal SG1 is also used for driving the first coils 14 as the capacitive touch driving electrodes to perform the capacitive touch scanning as described above, thus, at any time during the capacitive touch, each of the first coils 14 is used for the capacitive touch scanning. However, in order to avoid this case mentioned above, only the first signal lines 12 which are electrically connected with the first coils 14 required for the capacitive touch scanning receive the first driving signal SG1, and hence the corresponding first coil 14 receives the first driving signal SG1 from the common line 13 and the first signal line 12, thereby enhancing the ability of the capacitive touch scanning of the corresponding first coil 14; while for the first coil 14 which is not required to perform the capacitive touch scanning, the first signal line 12 electrically connected with the first coil 14 receives the second driving signal SG2, so that the corresponding coil 14, which receives the first driving signal SG1 from the common line 13 and the second driving signal SG2 from the corresponding first signal line 12, has a reduced ability of the capacitive touch scanning because the first driving signal SG1 has a phase inverse to that of the second driving signal SG2, to prevent affecting the capacitive touch scanning performed by the first coils 14 required for the capacitive touch scanning.

Alternatively, at any time during the capacitive touch, at least two adjacent first signal lines receive the first driving signal. Considering that the size of the first coil for realizing the electromagnetic touch function is far smaller than the size of a capacitive touch driving electrode for realizing the capacitive touch function, in order to enhancing the capacitive touch scanning, at least two adjacent first coils functioning as the capacitive touch driving electrode are used to perform the capacitive touch scanning at any time during the capacitive touch, that is, at least two adjacent first signal lines receive the first driving signal, so that the at least two adjacent first coils simultaneously used for performing the capacitive touch scanning collectively function as one capacitive touch driving electrode, thereby enhancing the capacitive touch scanning.

The above description illustrates that the first electrodes form the first coils and the first coil functions as a capacitive touch driving electrode when the capacitive touch is performed. However, the first coils extend along only one direction, and electromagnetic coils extending along another direction are also required to implement the electromagnetic touch function and determine location coordinates of an electromagnetic touch point. Moreover, in the disclosure, the electromagnetic touch function is realized by a mutual capacitance mode, i.e. the electromagnetic touch function is realized by the mutual capacitance formed between a capacitive touch driving electrode and a capacitive touch sensing electrode. Next, the following embodiments of the disclosure show a structure and an arrangement of a second coil functioning as a second coil extending along the other direction and the capacitive touch sensing electrode.

It should be noted that in the following embodiments of a touch panel including a second coil and a capacitive touch sensing electrode, the structure of the first coils corresponding to the case of FIG. 1 where N is equal to 8 is taken as an example for the description. Any other touch panel including second coils and capacitive touch sensing electrodes corresponding to the structures of other first coils described above can also be derived as like in this example.

Figure 5A:
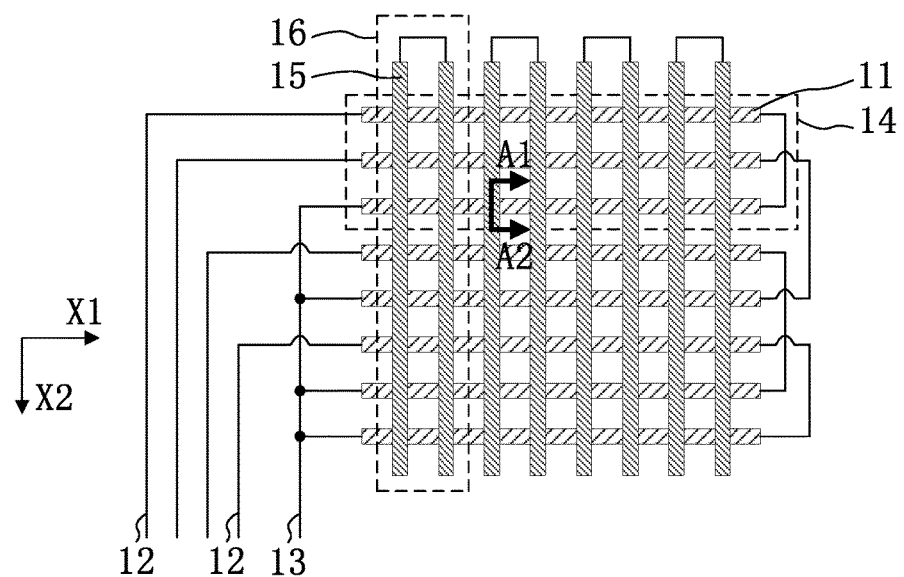
FIG. 5A is a schematic view showing a structure of yet another touch panel, according to embodiments of the disclosure.

FIG. 5A is a schematic view showing the structure of yet another touch panel, according to embodiments of the disclosure. As shown in FIG. 5A, in addition to the structure shown in FIG. 1, the touch panel also includes a plurality of second electrodes 15 extending along the second direction X2 and arranged along the first direction X1, where each second coil 16 is formed by at least two second electrodes 15 electrically connected with each other, and the second coils 16 are arranged along the first direction X1. It should be noted that in FIG. 5A, starting from the left side of FIG. 5A, upper terminals of two adjacent second electrodes 15 are electrically connected with each other to form one second coil 16, which is only an example of forming the second coil 16 by two second electrodes 15, and in other examples, other combinations of two second electrodes 15 can be electrically connected to form a second coil or the second coil may be formed by more than two electrically connected second electrodes. With respect to the forming of the second coils 16 by the second electrodes 15, reference can be made to the above description of forming the first coils 14 by the first electrodes 11, which is omitted hereinafter.

Figure 5B:
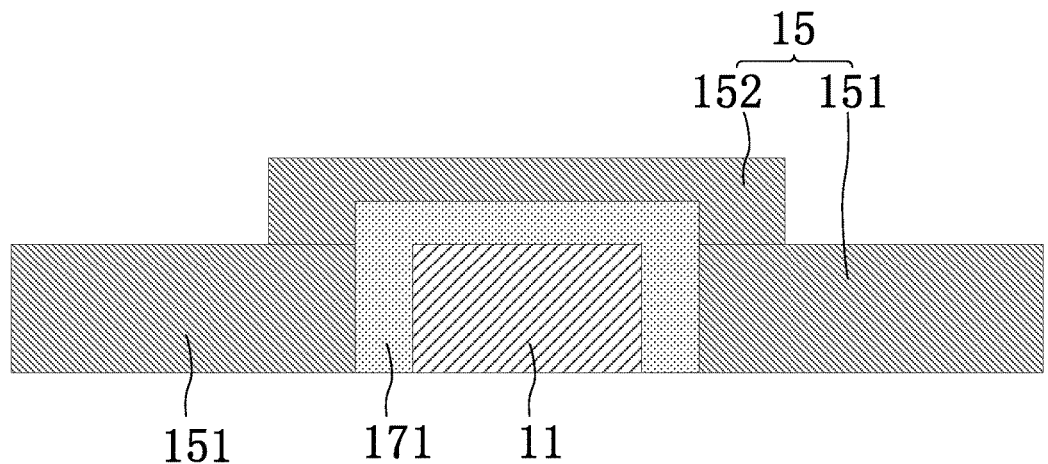
FIG. 5B is a schematic diagram showing a cross-section of the touch panel taken along a line A1-A2 in FIG. 5A.

FIG. 5B is a schematic cross-sectional diagram showing the touch panel along a line A1-A2 in FIG. 5A. As shown in FIG. 5A and FIG. 5B, the second electrode 15 includes a body part 151 and a first bridge 152, where the body part 151 and the first electrode 11 are located at the same layer, the body part 151 is electrically connected with the first bridge 152 at an intersection of the first electrode 11 and the second electrode 15, and the first bridge 152 is electrically insulated from the first electrode 11 through a first insulation layer 171.

Figure 6A:
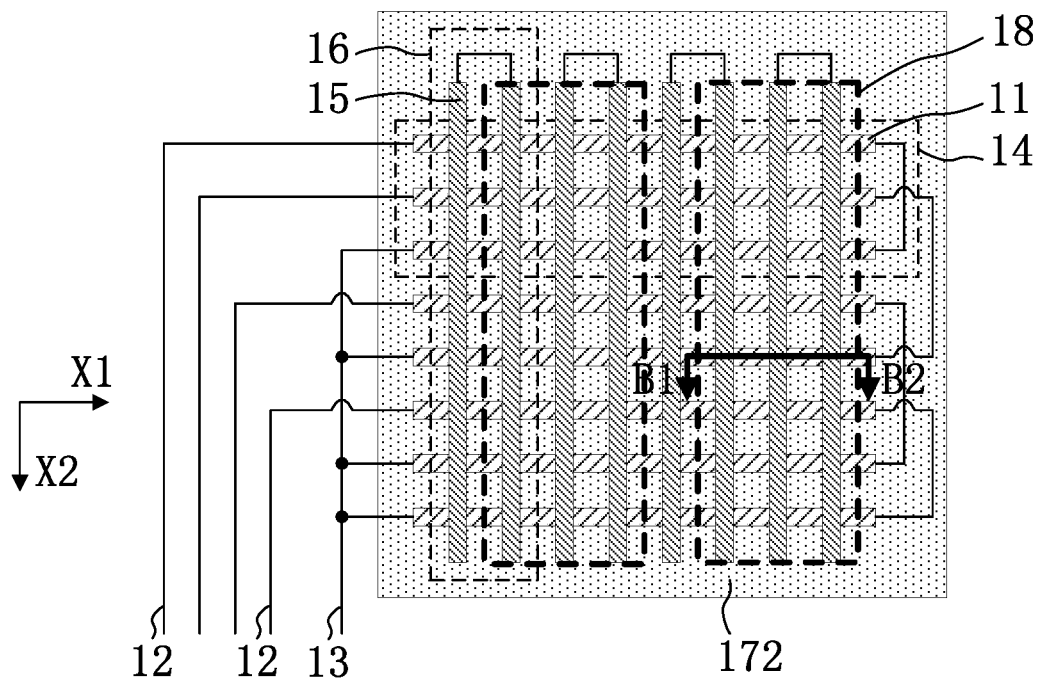
FIG. 6A is a schematic view showing a structure of yet another touch panel, according to embodiments of the disclosure.

FIG. 6A is a schematic view showing the structure of yet another touch panel, according to embodiments of the disclosure. As shown in FIG. 6A based on the touch panel in FIG. 5A, the touch panel also includes a plurality of capacitive touch sensing electrodes 18 extending along the second direction X2 and arranged along the first direction X1, where the capacitive touch sensing electrode 18 is located below the first electrode 11 and is electrically insulated from the first electrode 11 through a second insulation layer 172.

Figure 6B:
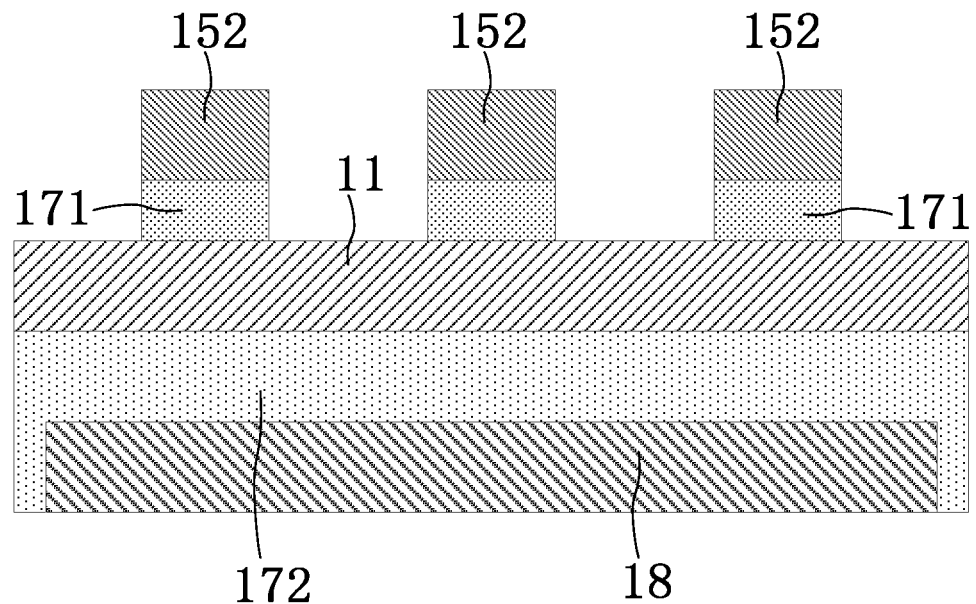
FIG. 6B is a schematic diagram showing a cross-section of the touch panel taken along a line B1-B2 in FIG. 6A.

FIG. 6B is a schematic cross-sectional diagram showing the touch panel along a line B1-B2 in FIG. 6A. As shown in FIG. 6B, the first electrode 11 is located above the capacitive touch sensing electrode 18 and is electrically insulated from the capacitive touch sensing electrode 18 through the second insulation layer 172, and the first bridge 152 is located over the first electrode 11 and is electrically insulated from the first electrode 11 through the first insulation layer 171.

Although FIG. 6A shows that the capacitive touch sensing electrode 18 is located below the first electrode 11, which is only an example of the arrangement of the capacitive touch sensing electrode 18 in the disclosure, the capacitive touch sensing electrode can be located above the first electrode in another example, as long as the capacitive touch sensing electrode and the first electrode are not located on the same layer, which is not limited herein.

Although FIG. 6A illustrates that the first electrodes forming the first coil and the second electrodes forming the second coil are located at the same layer, which is only an example of the arrangement of the first electrodes and the second electrodes, the first electrodes and the second electrodes can be located at different layers in the following examples.

Figure 7A:
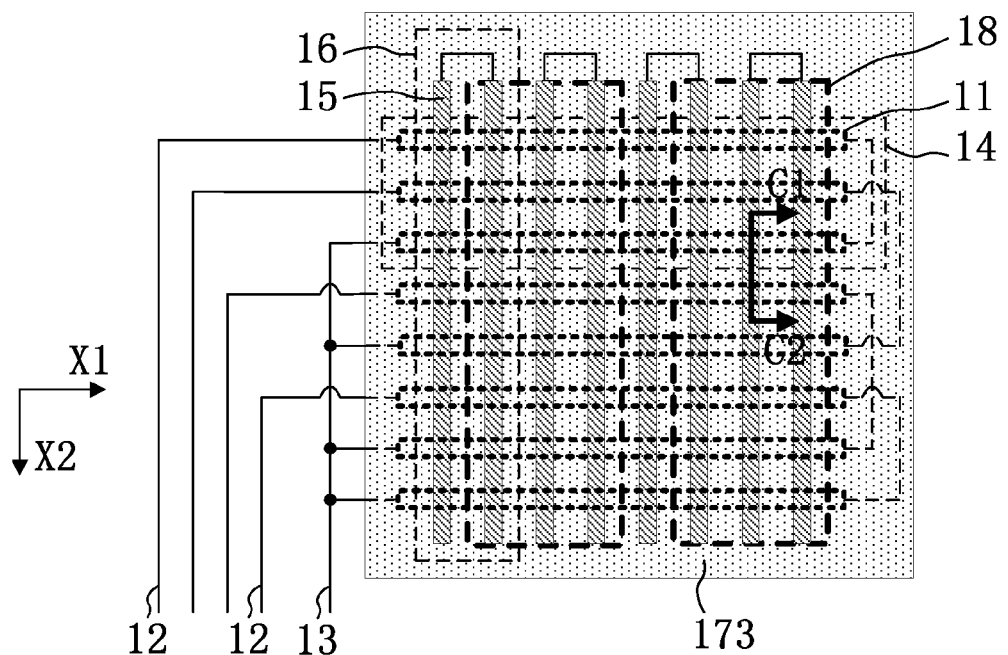
FIG. 7A is a schematic view showing a structure of yet another touch panel, according to embodiments of the disclosure.

FIG. 7A is a schematic view showing the structure of yet another touch panel, according to embodiments of the disclosure. As shown in FIG. 7A, the touch panel also includes a plurality of second electrodes 15 extending along the second direction X2 and arranged along the first direction X1, each second coil 16 is formed by at least two second electrodes 15 electrically connected with each other, and the second coils 16 are arranged along the first direction X1, where the second electrode 15 is located at a layer different from the first electrode 11 and is electrically insulated from the first electrode 11. As shown in FIG. 7A, the touch panel also includes a plurality of capacitive touch sensing electrodes 18 extending along the second direction X2 and arranged along the first direction X1.

It should be noted that the second coil 16 formed by the second electrodes 15 in FIG. 7A is the same as the second coil 16 formed by the second electrodes 15 in FIG. 5A, and more details can be referred to related descriptions and explanations related to FIG. 5A.

Figure 7B:
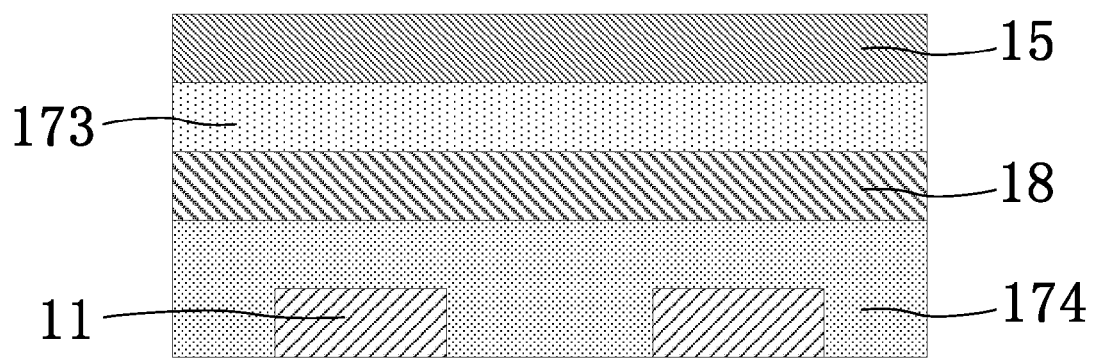
FIG. 7B is a schematic diagram showing a cross-section of the touch panel taken along a line C1-C2 in FIG. 7A.

FIG. 7B is a schematic cross-sectional diagram showing the touch panel along a line C1-C2 in FIG. 7A. As shown in FIGS. 7A and 7B, the capacitive touch sensing electrode 18 is located above the first electrode 11 and is electrically insulated from the first electrode 11 through a fourth insulation layer 174, and the second electrode 15 is located above the capacitive touch sensing electrode 18 and is electrically insulated from the capacitive touch sensing electrode 18 through a third insulation layer 173. As can be seen from FIG. 7B, the first electrode 11, the second electrode 15 and the capacitive touch sensing electrode 18 are located at layers different from one another.

Figure 7C:
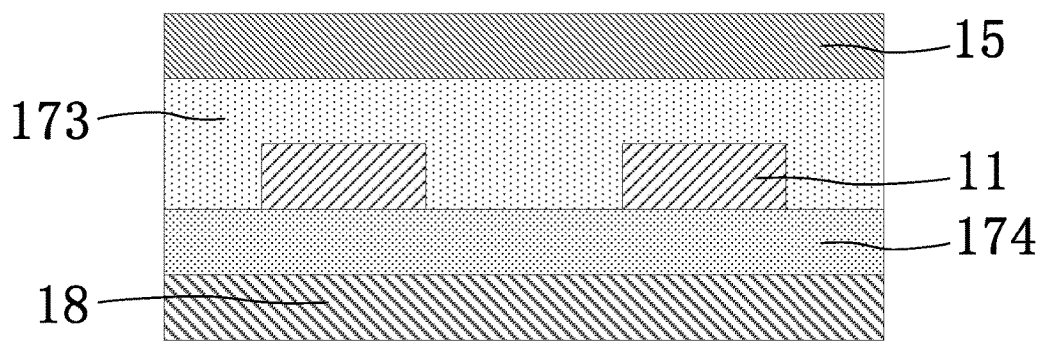
FIG. 7C is a schematic diagram showing another cross-section of the touch panel taken along the line C1-C2 in FIG. 7A.

FIG. 7C is a schematic cross-sectional diagram showing another example of the touch panel taken along a line C1-C2 in FIG. 7A. As shown in FIGS. 7A and 7C, the first electrode 11 is located above the capacitive touch sensing electrode 18 and is electrically insulated from the capacitive touch sensing electrode 18 through the fourth insulation layer 174, and the second electrode 15 is located above the first electrode 11 and is electrically insulated from the first electrode 11 through the third insulation layer 173. As can be seen from the structure of the touch panel in FIG. 7A, as shown in FIG. 7C, the first electrode 11, the second electrode 15 and the capacitive touch sensing electrodes 18 are located at layers different from one another.

Figure 7D:
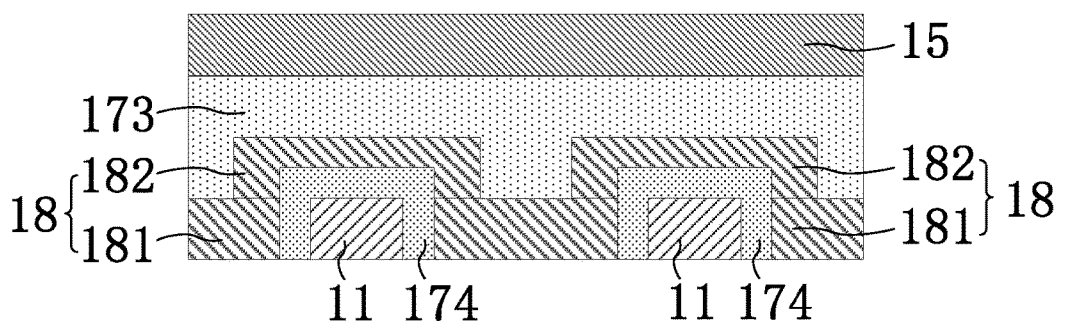
FIG. 7D is a schematic diagram showing yet another cross-section of the touch panel taken along the line C1-C2 in FIG. 7A.

FIG. 7D is a schematic diagram showing another example of a cross-section of the touch panel taken along the line C1-C2 in FIG. 7A. As shown in FIGS. 7A and 7D, the capacitive touch sensing electrode 18 includes a body part 181 and a second bridge 182, and the body part 181 and the first electrode 11 are located at the same layer, where the body part 181 is electrically connected with the second bridge 182 at an intersection of the capacitive touch sensing electrode 18 and the first electrode 11, and the first electrode 11 is electrically insulated from the capacitive touch sensing electrode 18 through the fourth insulation layer 174; further, a second electrode 15 is located above the capacitive touch sensing electrode 18 and is electrically insulated from the capacitive touch sensing electrode 18 through the third insulation layer 173. As can be seen from the structure of the display panel in FIG. 7A, as shown in FIG. 7D, the capacitive touch sensing electrode 18 and the first electrode 11 are located at the same layer, which is different from the layer of the second electrode 15.

Figure 8A:
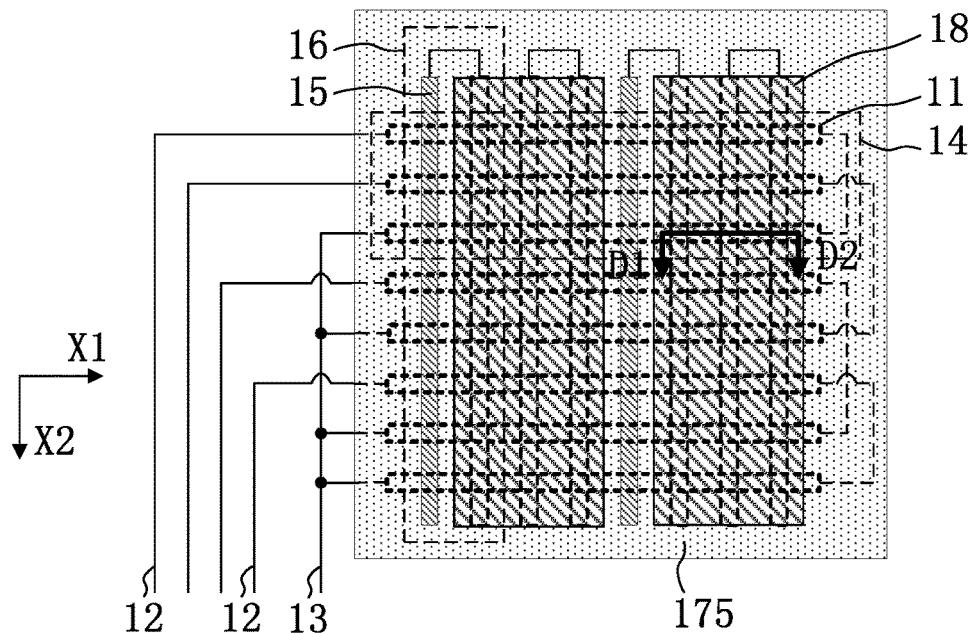
FIG. 8A is a schematic view showing a structure of yet another touch panel, according to embodiments of the disclosure.

However, in another example, the capacitive touch sensing electrode can be located at the same layer as the second electrode. FIG. 8A is a schematic view showing the structure of yet another touch panel, according to embodiments of the disclosure. As shown in FIG. 8A, FIG. 8A is based on FIG. 5A, the touch panel also includes: a plurality of second electrodes 15 extending along the second direction X2 and arranged along the first direction X1, second coils 16 arranged along the first direction X1 and each formed by at least two second electrodes 15 electrically connected with each other, and a plurality of capacitive touch sensing electrodes 18 extending along the second direction X2 and arranged along the first direction X1, where the capacitive touch sensing electrode 18 is located at the same layer as the second electrode 15 but at a layer different from the layer of the first electrode 11. It should be noted that the second coil 16 formed by the second electrodes 15 in FIG. 8A is the same as the second coil 16 formed by the second electrodes 15 in FIG. 5A, and more details can be referred to related descriptions and explanations related to FIG. 5A.

Figure 8B:
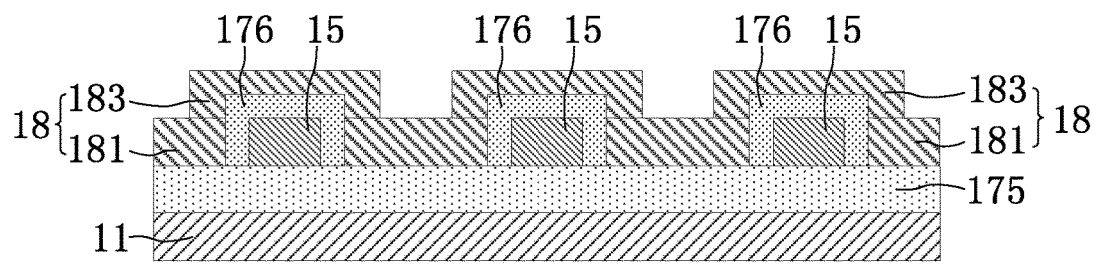
FIG. 8B is a schematic diagram showing a cross-section of the touch panel taken along a line D1-D2 in FIG. 8A.

FIG. 8B is a schematic cross-sectional diagram showing the touch panel along a line D1-D2 in FIG. 8A. As shown in FIGS. 8A and 8B, the capacitive touch sensing electrode 18 includes a body part 181 and a third bridge 183, and the body part 181 and the second electrode 15 are located in the same layer, where the body part 181 is electrically connected with the third bridge 183 at an intersection of the capacitive touch sensing electrode 18 and the second electrode 15, and the capacitive touch sensing electrode 18 is electrically insulated from the second electrode 15 through a sixth insulation layer 176; further, a first electrode 11 is located below the capacitive touch sensing electrode 18 and the second electrode 15 and is electrically insulated from the capacitive touch sensing electrode 18 and the second electrode 15 through a fifth insulation layer 175. As can be seen from the structure in FIG. 8A, as shown in FIG. 8B, the capacitive touch sensing electrode 18 and the second electrode 15 are located at the same layer, which is different from the layer of the first electrode 11.

Figure 9A:
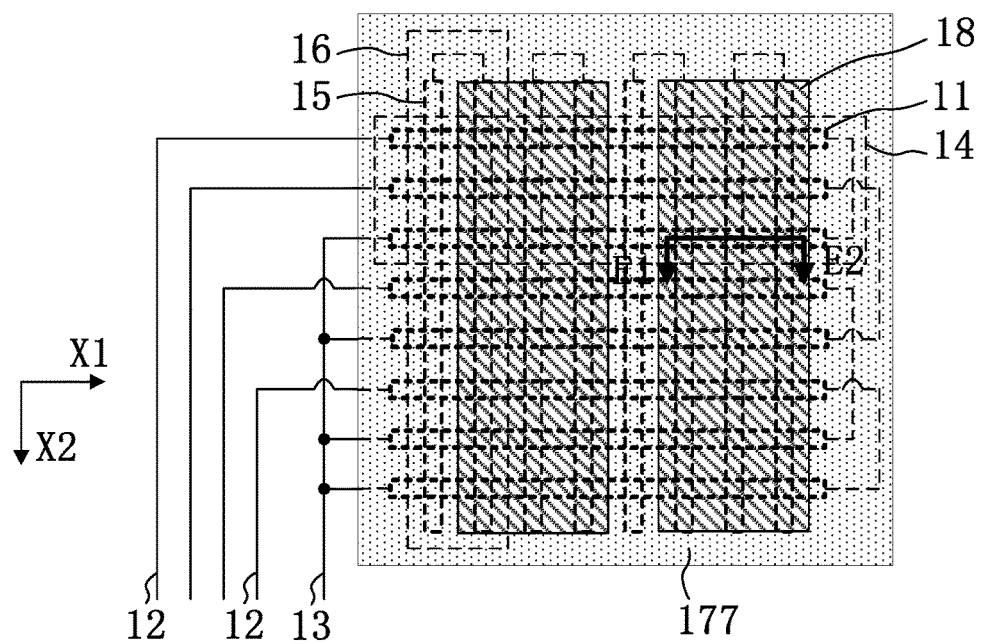
FIG. 9A is a schematic view showing a structure of yet another touch panel, according to embodiments of the disclosure.

In another example, the capacitive touch sensing electrode, the first electrode and the second electrode are located at layers different from one another, and the capacitive touch sensing electrode is located above the first electrode and the second electrode. FIG. 9A is a schematic view showing the structure of yet another touch panel, according to embodiments of the disclosure. As shown in FIG. 9A, FIG. 9A is based on FIG. 5A, the touch panel also includes a plurality of second electrodes 15 extending along the second direction X2 and arranged along the first direction X1, second coils 16 arranged along the first direction X1 and each formed by at least two second electrodes 15 electrically connected with each other, and a plurality of capacitive touch sensing electrodes 18 extending along the second direction X2 and arranged along the first direction X1, where the capacitive touch sensing electrode 18, the first electrode 11 and the second electrode 15 are located at layers different from one another. It should be noted that the second coil 16 formed by the second electrodes 15 in FIG. 9A is the same as the second coil 16 formed by the second electrodes 15 in FIG. 5A, and more details can be referred to related descriptions and explanations related to FIG. 5A.

Figure 9B:
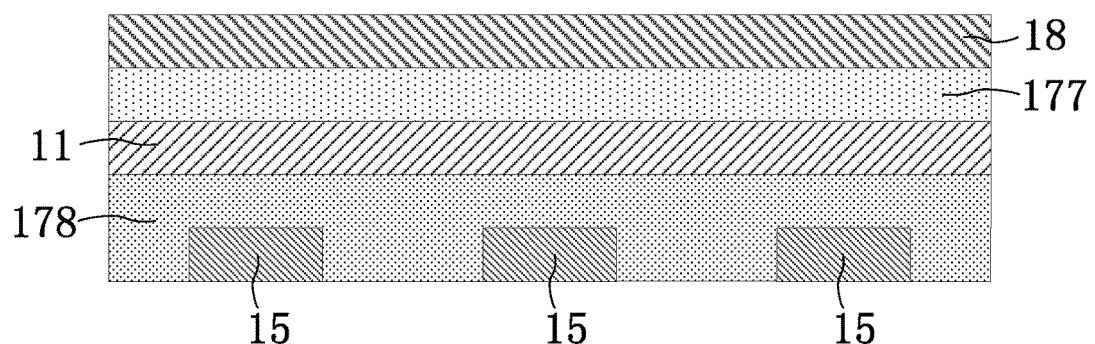
FIG. 9B is a schematic diagram showing a cross-section of the touch panel taken along a line E1-E2 in FIG. 9A.

FIG. 9B is a schematic cross-sectional diagram showing the touch panel along a line E1-E2 in FIG. 9A. As shown in FIGS. 9A and 9B, the first electrode 11 is located above the second electrode 15 and is electrically insulated from the second electrode 15 through an eighth insulation layer 178; and the capacitive touch sensing electrodes 18 is located above the first electrode 11 and is electrically insulated from the first electrode 11 through a seventh insulation layer 177. As can be seen from the structure in FIG. 9A, as shown in FIG. 9B, the capacitive touch sensing electrode 18, the first electrode 11 and the second electrode 15 are located at layers different from one another, the first electrode 11 is located above the second electrode 15, and the capacitive touch sensing electrode 18 is located above the first electrode 11 and the second electrode 15.

Figure 9C:
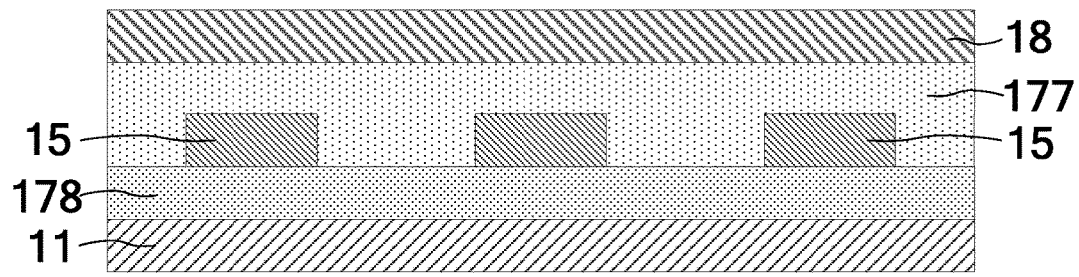
FIG. 9C is a schematic diagram showing another cross-section of the touch panel taken along the line E1-E2 in FIG. 9A.

FIG. 9C is a schematic diagram showing another cross-section of the touch panel taken along a line E1-E2 in FIG. 9A. As shown in FIGS. 9A and 9C, the second electrode 15 is located above the first electrode 11 and is electrically insulated from the first electrode 11 through the eighth insulation layer 178; and the capacitive touch sensing electrodes 18 is located above the second electrode 15 and is electrically insulated from the second electrode 15 through the seventh insulation layer 177. As can be seen from FIG. 9C, the capacitive touch sensing electrode 18, the first electrode 11 and the second electrode 15 are located at layers different from one another, the second electrode 15 is located above the first electrode 11, and the capacitive touch sensing electrodes 18 is located above the first electrode 11 and the second electrode 15.

FIGS. 7A and 8A mentioned above show examples of the arrangement of the capacitive touch sensing electrodes in the case where the first electrode is located below the second electrode, and FIG. 9A shows an example of arranging the capacitive touch sensing electrode above the first electrode and the second electrode in the case where the first electrode and the second electrode are located at different layers. However, in other examples, the first electrode can be located above the second electrode, and the capacitive touch sensing electrode can be located at the same layer as the first or second electrode or can be located between the first electrode and the second electrode, or can be located below the second electrode and so on, which is not limited herein.

Figure 10:
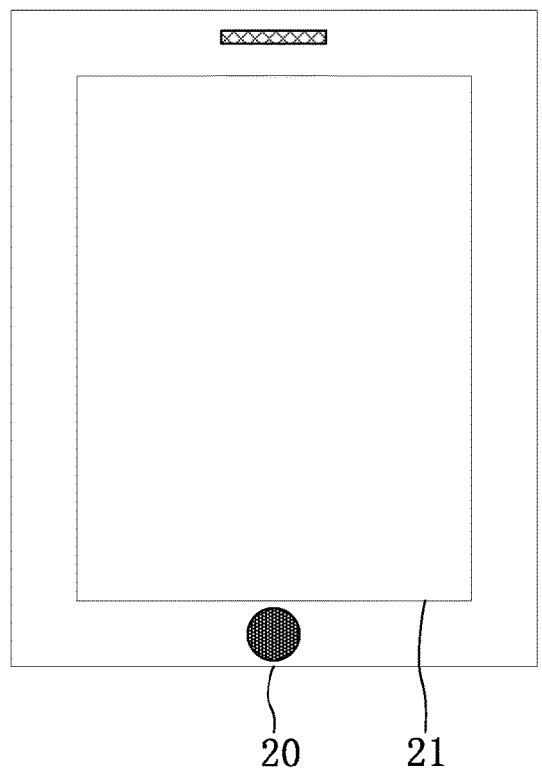
FIG. 10 is a schematic view showing a structure of a touch device, according to embodiments of the disclosure.

Embodiments of the disclosure also provide a touch device. FIG. 10 is a schematic view showing the structure of a touch device, according to embodiments of the disclosure. As shown in FIG. 10, the touch device 20 includes a touch panel 21 which may be any touch panel according to any of the embodiments mentioned above.

FIG. 11 is a schematic view showing the structure of a touch device, according to embodiments of the disclosure. As shown in FIG. 11, a touch panel 21 of the touch device includes eight first electrodes 211 extending along a first direction Y1 and arranged along a second direction Y2, four first signal lines 213 and one common line 214; where along the second direction Y2, a right-side terminal of the first one of the first electrodes 211 is electrically connected with a right-side terminal of the third one of the first electrodes 211 to form a first coil 212, a left-side terminal of the first one of the first electrodes 211 functions as a first terminal of the first coil 212, and a left-side terminal of the third one of the first electrodes 211 functions as a second terminal of the first coil 212; a right-side terminal of the second one of the first electrodes 211 is electrically connected with a right-side terminal of the fifth one of the first electrodes 211 to form another first coil 212, a left-side terminal of the second one of the first electrodes 211 functions as a first terminal of the another first coil 212, and a left-side terminal of the fifth one of the first electrodes 211 functions as a second terminal of the another first coil 212; a right-side terminal of the fourth one of the first electrodes 211 is electrically connected with a right-side terminal of the seventh one of the first electrodes 211 to form a first coil 212, a left-side terminal of the fourth one of the first electrodes 211 functions as a first terminal of the corresponding first coil 212, and a left-side terminal of the seventh one of the first electrodes 211 functions as a second terminal of the corresponding first coil 212; a right-side terminal of the sixth one of the first electrodes 211 is electrically connected with a right-side terminal of the eighth one of the first electrodes 211 to form one first coil 212, a left-side terminal of the sixth one of the first electrodes 211 functions as a first terminal of the corresponding first coil 212, and a left-side terminal of the eighth one of the first electrodes 211 functions as a second terminal of the corresponding first coil 212; each of the first terminals of all the first coils 212 is electrically connected with the corresponding first signal line 213, and each of the second terminals of all the first coils 212 is electrically connected with the common line 214. It should be noted that the first electrodes included in the touch panel and the first coils constituted by the first electrodes are illustrative for describing this implementation of the touch panel, and the touch panel can be any of the touch panels described in the above embodiments, which is not limited herein.

Alternatively, as shown in FIG. 11, the touch device also includes a first processing unit 22 which is electrically connected with the first signal lines 213 and is configured to receive and process induced currents output by the first signal lines 213 when an electromagnetic touch is performed. The processing by the first processing unit 22 includes computing the induced currents output by the first signal lines 213 to obtain a coordinate corresponding to the location of the electromagnetic touch point in at least one of the first direction Y1 and the second direction Y2.

Alternatively, as shown in FIG. 11, the touch device also includes a first driving signal generation unit 23 and a second driving signal generation unit 24, where the first driving signal generation unit 23 is electrically connected with the first signal lines 213 and the common line 214, and the second driving signal generation unit 24 is electrically connected with the first signal lines 213. At any time during the capacitive touch function, the first driving signal generation unit 23 provides a first driving signal to the common line 214 and a part of the first signal lines 213, and the second driving signal generation unit 24 provides a second driving signal to the other part of the first signal lines 213.

Each of the first signal lines 213 is electrically connected with a different output end of the first driving signal generation unit 23, and whether a first driving signal is applied to the first signal line 213 depends on the control by the corresponding output end of the first driving signal generation unit 23; similarly, each of the first signal lines 213 is also electrically connected with a different output end of the second driving signal generation unit 24, and whether a second driving signal is applied to the first signal line 213 depends on the control by the corresponding output end of the second driving signal generation unit 23. When the first driving signal is required to be provided to a part of the first signal lines 213, the touch device (a CPU or a component having the function of a CPU in the touch device, for example) sends an instruction to the first driving signal generation unit 23 to instruct the first driving signal generation unit 23 to provide the first driving signal to the part of the first signal lines 213 and the common line 214, so that the first driving signal generation unit 23 applies the first driving signal to the part of the first signal lines 213 and the common line 214 through the output ends of the first driving signal generation unit 23, meanwhile, the touch device (a CPU or a component having the function of a CPU in the touch device, for example) sends an instruction to the second driving signal generation unit 24 to instruct the second driving signal generation unit 24 to supply the second driving signal to the first signal lines 213 not applied with the first driving signal, so that the second driving signal generation unit 24 applies the second driving signal to the corresponding first signal lines 213 through the output ends of the second driving signal generation unit 24. As such, at any time during the capacitive touch, the first driving signal and the second driving signal are applied to different first signal lines 213, respectively, and reference can be made to the related description of the touch panel in the disclosure for the resultant effect.

As shown in FIG. 11, the touch panel also includes a switch unit 25 electrically connected between the common line 214 and the grounding terminal GND. When the electromagnetic touch is performed, the switch unit 25 is turned on to connect the common line 214 with the grounding terminal GND, and when the capacitive touch is performed, the switch unit 25 is turned off to disconnect the common line 214 from the grounding terminal GND.

It should be noted that the switch unit 25 can be a level switch or a triode or other elements functioning as the switch, which is not limited herein. If the switch unit 25 is embodied as a N-channel Metal Oxide Semiconductor (NMOS) transistor, when the electromagnetic touch is performed, the touch device (a CPU or a component having the function of a CPU in the touch device, for example) sends a high-level signal to a gate of the NMOS transistor, so that the NMOS transistor is turned on and the common line 214 is connected with the grounding terminal GND; and when the capacitive touch is performed, the touch device (a CPU or a component having the function of a CPU in the touch device, for example) sends a low-level signal to the gate of the NMOS transistor, so that the NMOS transistor is turned off and the common line 214 is disconnected from the grounding terminal GND.

Embodiments of the disclosure provide a method for driving a touch device including a touch panel, where the touch panel includes: a plurality of first electrodes extending along a first direction and arranged along a second direction; a plurality of first signal lines and a common line; and first coils arranged along the second direction and each formed by at least two of the first electrodes, which are electrically connected to one another, where a first terminal of each first coil is electrically connected with a corresponding one of the first signal lines, and a second terminal of each first coil is electrically connected with the common line; and the first coil is configured to receive an electromagnetic signal and generate an induced current when an electromagnetic touch is performed, and function as a capacitive touch driving electrode when a capacitive touch is performed. Here, the touch panel is the touch panel described in any of the above embodiments. FIG. 12 is a flow chart showing the method for driving a touch device according to embodiments of the disclosure, and the driving method includes:

Step 31 of electrically connecting the common line with a grounding terminal and processing an induced current generated by the first coil and output by the first signal line, when performing the electromagnetic touch; and Step 32 of disconnecting the common line from the grounding terminal and applying a first driving signal to the common line when performing the capacitive touch; and applying, at any time during the capacitive touch, the first driving signal to a part of the first signal lines to perform an capacitive touch scanning on first coils electrically connected with the part of the first signal lines, and simultaneously applying a second driving signal to another part of the first signal lines, where the first driving signal has a phase inverse to a phase of the second driving signal.

It should be noted that, in the above driving method, the sequences of step 31 and step 32 can be inverted as desired, that is, the touch device can perform the electromagnetic touch function before the capacitive touch function, or can perform the capacitive touch function before the electromagnetic touch function, which is not limited herein. In addition, the part of the first signal lines may include one or more first signal lines, which is not limited herein.

At any time during a capacitive touch, conventionally only a part of capacitive touch driving electrodes receive the driving signal to perform the capacitive touch scanning, that is, at any time during a capacitive touch, only a part of capacitive touch driving electrodes are used to perform the capacitive touch scanning. In the disclosure, each of the second terminals of the first coils is electrically connected with the common line, and when the capacitive touch is performed, the first coil functions as a capacitive touch driving electrode and a first driving signal is applied to the common line, here the first driving signal is used for driving the first coil functioning as a capacitive touch driving electrode to perform the capacitive touch scanning, so that all the first coils are used for the capacitive touch scanning during a capacitive touch. Therefore, in order to avoid the case mentioned above, for any first coil required to perform the capacitive touch scanning, a first driving signal is applied to the first signal line electrically connected with the first coil, thus the first driving signal from the common line and the first signal line is applied to the first coil, thereby enhancing the ability of the capacitive touch scanning of the first coil; while for any first coil not required for performing the capacitive touch scanning, a second driving signal is applied to the first signal line electrically connected with the first coil, so that the first driving signal from the common line and the second driving signal from the corresponding first signal line are both applied to the first coil, thereby reducing the ability of the capacitive touch scanning of the corresponding first coil because the first driving signal has a phase inverse to a phase of the second driving signal, without affecting the capacitive touch scanning performed by the first coils required for the capacitive touch scanning.

Figure 13:
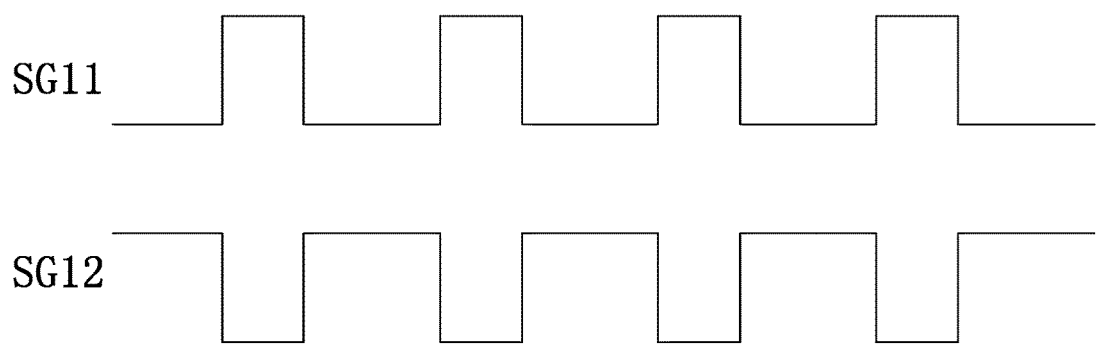
FIG. 13 is a diagram showing time sequences of a first driving signal and a second driving signal, according to embodiments of the disclosure.

In order to better understand the applying of the first driving signal and the second driving signal in the capacitive touch state, an example is given below. For example, a touch panel includes four first coils, that is, a first first coil, a second first coil, a third first coil and a fourth first coil, which correspond to a first first signal line, a second first signal line, a third first signal line and a fourth first signal line, respectively. FIG. 13 is a time sequence diagram of a first driving signal and a second driving signal, according to embodiments of the disclosure. As shown in FIG. 13, SG11 represents the first driving signal and a high level of the first driving signal is effective, and SG12 represents the second driving signal and a low level of the second driving signal is effective. In combination with FIG. 13, at a certain time during the capacitive touch, if the first driving signal SG11 is applied to the common line and the first first signal line, and the second driving signal SG12 is applied to the second, third and fourth first signal lines, accordingly, the first driving signal SG11 in the first first coil is enhanced, and hence the ability of the capacitive touch scanning of the first first coil is also enhanced, that is, at this time, the first first coil in the touch panel is used to perform the capacitive touch scanning, but for the second to fourth first coils, the second driving signal SG12 counteracts the first driving signal SG11 in the second to fourth first coils, so that the first driving signal SG11 in the second to fourth first coils is weakened, thus the second to fourth first coils have an insignificant impact or no impact on the ability of the capacitive touch scanning of the first first coil.

Further, the driving method also includes: at any time during the capacitive touch, applying the first driving signal to at least two adjacent first signal lines. Since the size of the first coil is far smaller than the size of a capacitive touch driving electrode implementing the capacitive touch function, the first driving signal is applied to at least two adjacent first signal lines at any time during the capacitive touch, so that the ability of the capacitive touch scanning of the first coils is enhanced and the frequency of the capacitive touch scanning is increased.

Further, the first coils corresponding to the at least two adjacent first signal lines are independent of each other or partly or entirely overlap each other. For example, at any time during the capacitive touch, the first driving signal is applied to four adjacent first signal lines corresponding to four first coils CL1, CL2, CL3 and CL4, here the four first coils CL1, CL2, CL3 and CL4 are independent of each other and do not overlap each other; or the first coil CL1 overlaps the first coil CL2, the first coil CL3 overlaps the first coil CL4, and the first coils CL1 and CL2 do not overlap the first coils CL3 and CL4, respectively; or the first coil CL1 overlaps the first coil CL2, and the first coil CL2 overlaps the first coil CL3, and the first coil CL3 overlaps the first coil CL4. Therefore, at any time during the capacitive touch, for different location relationships between the first coils simultaneously applied with the first driving signal, different processing manners are employed in the touch device, which is known by those skilled in the art and is omitted herein.

In embodiments of the disclosure, an amplitude of the first driving signal is the same as that of the second driving signal. In this way, at any time during the capacitive touch, the capacitive touch scanning ability of the first coil not required for performing the capacitive touch scanning can be better weakened. However, in embodiments, the amplitude of the first driving signal may be different than that of the second driving signal, which is not limited herein.

It should be noted that the above touch device can be any one provided with or without a display function depending on actual designs, which is not limited herein. For the touch device with the display function, the display function can be realized by the liquid crystal display panel or an Organic Light Emitting Display Panel light, and the touch device can be a mobile phone, tablet computer or electronic paper and so on.

With the touch panel, the touch device and the driving method thereof, first coils each formed by at least two electrically connected first electrodes are provided, where a first terminal of each first coil is electrically connected with one corresponding first signal line, a second terminal of the first coil is electrically connected with the common line, and when an electromagnetic touch is performed, the first coil is configured to receive an electromagnetic signal and generate an induced current, and when a capacitive touch is performed, the first coil functions as a capacitive touch driving electrode, so that the design space of the touch panel can be saved and the electromagnetic touch performance of the touch panel and the touch device can be improved, thereby increasing the SNR in the touch panel and the touch device when performing the electromagnetic touch.

It should be noted that the embodiments of the disclosure and the technical principles used therein have been described as above. It should be appreciated that the disclosure is not limited to the embodiments described herein, and alternatives, modifications and substitutions can be made by those skilled in the art without departing from the scope of the disclosure. Accordingly, while the disclosure is described in detail through the above embodiments, the disclosure is not limited to the above embodiments and can further include other additional embodiments without departing from the concept of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A touch panel, comprising:
a plurality of first electrodes extending along a first direction and arranged along a second direction;
a plurality of first signal lines;
one common line; and
first coils arranged along the second direction and each formed by at least two electrically connected first electrodes from the plurality of first electrodes, wherein the first coils are arranged to correspond to the plurality of first signal lines according to a one to one correspondence, the first coils are arranged in the second direction, a first terminal of each first coil is electrically connected with a corresponding one of the plurality of first signal lines, and a second terminal of each first coil is electrically connected with the one common line;
wherein the first coil is configured to receive an electromagnetic signal and generate an induced current when an electromagnetic touch is performed, and function as a capacitive touch driving electrode when a capacitive touch is performed,
wherein when the electromagnetic touch is performed, the one common line is electrically connected with a ground, and each of the plurality of first signal lines is configured to output an induced current generated by a respective one of the first coils, when the capacitive touch is performed, the one common line is configured to receive a first driving signal, and at any time during the capacitive touch, a part of the first signal lines are configured to receive the first driving signal, and another part of the first signal lines are configured to receive a second driving signal, wherein the first driving signal and the second driving signal are opposite in phase.

2. The touch panel according to claim 1, wherein, the first coil is formed by two electrically connected first electrodes, the number of the plurality of first electrodes is N, a number N/2 of the first coils are formed, and N is an even integer greater than 0.

3. The touch panel according to claim 2, wherein, when N is an integral multiple of 4, along the second direction, the $(2i-1)^{th}$ one of the first electrodes is electrically connected with the $(2i+1)^{th}$ one of the first electrodes to form the first coil, and the 2i' one of the first electrodes is electrically connected with the $(2i+2)^{th}$ one of the first electrodes to form the first coil, wherein i is an integer greater than or equal to 1 and less than or equal to (N−2)/2.

4. The touch panel according to claim 2, wherein, when N is an even integer greater than or equal to 6, along the second direction, the first one of the plurality of first electrodes is electrically connected with the third one of the plurality of first electrodes to form the first coil, the $2j^{th}$ one of the plurality of first electrodes is electrically connected with the $(2j+3)^{th}$ one of the plurality of first electrodes to form the first coil, and the $(N-2)^{th}$ one of the plurality of first electrodes is electrically connected with the $N^{th}$ one of the plurality of first electrodes to form the first coil, wherein j is an integer greater than or equal to 1 and less than or equal to (N−4)/2.

5. The touch panel according to claim 1, wherein, the first coil is formed by three electrically connected first electrodes from the plurality of first electrodes.

6. The touch panel according to claim 1, wherein, at any time during the capacitive touch, at least two adjacent first signal lines are configured to receive the first driving signal.

7. The touch panel according to claim 1, further comprising a plurality of second electrodes extending along the second direction and arranged along the first direction, wherein the second electrode comprises a body part and a first bridge, and second coils, each formed by at least two electrically connected second electrodes from the plurality of second electrodes, are arranged along the first direction, and wherein, the body part and the first electrode are located at the same layer, and the body part is electrically connected with the first bridge at an intersection of the first electrode and the second electrode.

8. The touch panel according to claim 7, further comprising a plurality of capacitive touch sensing electrodes extending along the second direction and arranged along the first direction, wherein the capacitive touch sensing electrode is arranged at a layer different from a layer of the first electrode and is electrically insulated from the first electrode.

9. The touch panel according to claim 1, further comprising a plurality of second electrodes extending along the second direction and arranged along the first direction, wherein second coils, each formed by at least two electrically connected second electrodes from the plurality of second electrodes, are arranged along the first direction, and the second electrode is arranged at a layer different from a layer of the first electrode and is electrically insulated from the first electrode.

10. The touch panel according to claim 9, further comprising a plurality of capacitive touch sensing electrodes extending along the second direction and arranged along the first direction, wherein the capacitive touch sensing electrode is arranged at a layer different from a layer of the first electrode and the second electrode and is electrically insulated from the first electrode and the second electrode.

11. The touch panel according to claim 9, further comprising a plurality of capacitive touch sensing electrodes extending along the second direction and arranged along the first direction, wherein the capacitive touch sensing electrode comprises a body part and a second bridge, and the body part of the capacitive touch sensing electrode and the first electrode are arranged at the same layer, and wherein the body part of the capacitive touch sensing electrode is electrically connected with the second bridge at an intersection of the capacitive touch sensing electrode and the first electrode; or the touch panel further comprising a plurality of capacitive touch sensing electrodes extending along the second direction and arranged along the first direction, wherein the capacitive touch sensing electrode comprises a body part and a third bridge, and the body part of the capacitive touch sensing electrode and the second electrode are arranged at the same layer, wherein the body part of the capacitive touch sensing electrode is electrically connected with the third bridge at an intersection of the capacitive touch sensing electrode and the second electrode.

12. The touch panel according to claim 1, wherein a number of the plurality of first signal lines is equal to a number of the first coils.

13. A touch device, comprising a touch panel, wherein the touch panel comprises:
a plurality of first electrodes extending along a first direction and arranged along a second direction;
a plurality of first signal lines;
one common line; and
first coils arranged along the second direction and each formed by at least two electrically connected first electrodes from the plurality of first electrodes, wherein the first coils are arranged to correspond to the plurality of first signal lines according to a one to one correspondence, the first coils are arranged in the second direction, a first terminal of each first coil is electrically connected with a corresponding one of the plurality of first signal lines, and a second terminal of each first coil is electrically connected with the one common line;
wherein the first coil is configured to receive an electromagnetic signal and generate an induced current when an electromagnetic touch is performed, and function as a capacitive touch driving electrode when a capacitive touch is performed,
wherein when the electromagnetic touch is performed, the one common line is electrically connected with a ground, and each of the plurality of first signal lines is configured to output an induced current generated by a respective one of the first coils, when the capacitive touch is performed, the one common line is configured to receive a first driving signal, and at any time during the capacitive touch, a part of the first signal lines are configured to receive the first driving signal, and another part of the first signal lines are configured to receive a second driving signal, wherein the first driving signal and the second driving signal are opposite in phase.

14. The touch device according to claim 13, further comprising a first processing unit electrically connected with the first signal line, wherein the first processing unit is configured to receive and process an induced current output by the first signal line when an electromagnetic touch is performed.

15. The touch device according to claim 14, further comprising a first driving signal generation unit and a second driving signal generation unit, wherein the first driving signal generation unit is electrically connected with the first signal lines and the one common line, and the second driving signal generation unit is electrically connected with the first signal lines; and at any time during a capacitive touch, the first driving signal generation unit is configured to provide a first driving signal to the one common line and a part of the first signal lines, and the second driving signal generation unit is configured to provide a second driving signal to the other part of the first signal lines.

16. The touch device according to claim 14, further comprising a switch unit electrically connected between the one common line and a grounding terminal, wherein when the electromagnetic touch is performed, the switch unit is configured to connect the one common line with the grounding terminal; and when the capacitive touch is performed, the switch unit is configured to disconnect the one common line from the grounding terminal.

17. A driving method for a touch device comprising a touch panel, wherein the touch panel comprises: a plurality of first electrodes extending in a first direction and arranged in a second direction; a plurality of first signal lines; one common line; and first coils arranged along the second direction and each formed by at least two electrically connected first electrodes from the plurality of first electrodes, wherein the first coils are arranged to correspond to the plurality of first signal lines according to a one to one correspondence, the first coils are arranged in the second direction, a first terminal of each first coil is electrically connected with a corresponding one of the plurality of first signal lines, and a second terminal of each first coil is electrically connected with the one common line; and when an electromagnetic touch is performed, the first coil is configured to receive an electromagnetic signal and generate an induced current; and when a capacitive touch is performed, the first coil functions as a capacitive touch driving electrode, wherein the driving method comprises:

electrically connecting the one common line with a grounding terminal and processing the induced current generated by the first coil and output by the first signal line, when performing the electromagnetic touch; and disconnecting the one common line from the grounding terminal and applying a first driving signal to the one common line when performing the capacitive touch, and applying, at any time during the capacitive touch, the first driving signal to a part of the first signal lines to perform an capacitive touch scanning on first coils electrically connected with the part of the first signal lines, and simultaneously applying a second driving signal to another part of the first signal lines, wherein the first driving signal has a phase inverse to that of the second driving signal.

18. The driving method according to claim 17, further comprising: applying the first driving signal to at least two adjacent first signal lines at any time during a capacitive touch.

19. The driving method according to claim 18, wherein the first coils corresponding to at least two adjacent first signal lines are independent of each other, or partly or entirely overlap each other.

20. The driving method according to claim 17, wherein an amplitude of the first driving signal is equal to that of the second driving signal or an amplitude of the first driving signal is different from that of the second driving signal.

* * * * *